US012474933B2

(12) United States Patent
Sundström et al.

(10) Patent No.: US 12,474,933 B2
(45) Date of Patent: Nov. 18, 2025

(54) METHOD, SYSTEM, AND DEVICE FOR INTEGRATING REPLACEMENT DEVICE

(71) Applicant: Sony Group Corporation, Tokyo (JP)

(72) Inventors: Henrik Sundström, Lund (SE); Pär Spjuth, Södra Sandby (SE); Anders Isberg, Åkarp (SE)

(73) Assignee: Sony Group Corporation, Tokyo (JP)

( * ) Notice: Subject to any disclaimer, the term of this patent is extended or adjusted under 35 U.S.C. 154(b) by 322 days.

(21) Appl. No.: 18/116,103

(22) Filed: Mar. 1, 2023

(65) Prior Publication Data

US 2023/0297392 A1 Sep. 21, 2023

(30) Foreign Application Priority Data

Mar. 15, 2022 (SE) .................................... 2250324-7

(51) Int. Cl.
*G06F 9/445* (2018.01)
(52) U.S. Cl.
CPC ................................ *G06F 9/44505* (2013.01)
(58) Field of Classification Search
CPC ....................................................... G06F 9/445
See application file for complete search history.

(56) References Cited

U.S. PATENT DOCUMENTS

| 7,356,679 B1* | 4/2008 | Le ......................... G06F 16/116 |
| | | 713/1 |
| 7,577,722 B1* | 8/2009 | Khandekar ......... G06F 9/45558 |
| | | 718/1 |
| 8,631,269 B2 | 1/2014 | Vinayak et al. |
| 10,044,675 B1* | 8/2018 | Ettema ................ H04L 63/0227 |
| 10,530,752 B2 | 1/2020 | Donlan et al. |
| 11,012,304 B1 | 5/2021 | Gopalarathnam |
| 11,076,018 B1 | 7/2021 | Mehta |
| 2006/0224663 A1* | 10/2006 | DiFalco ................ H04L 12/66 |
| | | 709/203 |

(Continued)

FOREIGN PATENT DOCUMENTS

EP 3211864 A1 8/2017

OTHER PUBLICATIONS

Office Action and Search Report from corresponding Swedish Application No. 2250324-7, mailed on Oct. 7, 2022, 9 pages.

(Continued)

*Primary Examiner* — Phil K Nguyen
(74) *Attorney, Agent, or Firm* — Tucker Ellis LLP

(57) ABSTRACT

A method for integrating a replacement device in a cluster of devices includes, by the replacement device, requesting a contextual data structure from a first device of the cluster of devices and/or at least one outside device; obtaining based on the received contextual data structure, contextual data indicative of an environmental context of the replacement device; and providing the contextual data to at least one device of the cluster and/or the outside device(s). The at least one device and/or outside device(s) determining whether the contextual data meets a context criterion of a stored contextual data indicative of contextual data of a replaced device. If so, the replacement device receives from one or more of the first device, the at least one device, or the outside device(s), state data indicative of a known state of the replaced device, and updating the replacement device with the state data.

20 Claims, 7 Drawing Sheets

(56)  References Cited

U.S. PATENT DOCUMENTS

| | | | |
|---|---|---|---|
| 2015/0163121 A1 | 6/2015 | Mahaffey et al. | |
| 2017/0339178 A1* | 11/2017 | Mahaffey | G06F 11/3006 |
| 2018/0285219 A1* | 10/2018 | Donlan | G06F 11/1662 |
| 2018/0287801 A1 | 10/2018 | Donlan | |
| 2018/0349227 A1* | 12/2018 | Cisler | G06F 11/1451 |
| 2020/0103894 A1 | 4/2020 | Cella et al. | |
| 2021/0297279 A1 | 9/2021 | Pognant | |
| 2021/0311509 A1 | 10/2021 | Kishore et al. | |

OTHER PUBLICATIONS

Cisco DNA Center User Guide, Release 2.1.2, Chapter Titled "Manage Your Inventory", Oct. 29, 2021.
Juniper Networks, Junos Space Network Management Platform—Workspaces User Guide, Release 20.3, Published Oct. 11, 2021.

* cited by examiner

METHOD, SYSTEM, AND DEVICE FOR INTEGRATING REPLACEMENT DEVICE

CROSS REFERENCE TO RELATED APPLICATIONS

This application claims priority to Swedish Patent Application No. 2250324-7, filed Mar. 15, 2022, the content of which is incorporated herein by reference in its entirety.

TECHNICAL FIELD

The present disclosure pertains to the field of device management, such as for integration of a replacement device into a cluster of devices. The present disclosure relates to methods, related system, and a related device.

BACKGROUND

A cluster of devices, such as a group of communicating devices, may be connected in a local network. Due to age or reduced functionality, one or more devices of the cluster may need to be replaced, and it may be advantageous that a newly introduced, such as replacement, device assumes the state and operational role of the replaced device.

In order to replace the replaced device with the replacement device, a human operator would have to, in addition to physically replacing the replaced device, manage the introduction of the replacement device into the system. This can include looking up the replaced device's identity, removing the replaced device's identity from the system, looking up the replacement device's identity, entering the replacement device's identity into the system, and, in many cases, the manually provision and configure the replacement device with the settings needed for proper operation.

SUMMARY

Accordingly, there is a need for systems, devices, and methods, which may mitigate, alleviate or address the shortcomings existing, for example by improving integration of replacement devices into a cluster of devices.

Disclosed here is a method. The method is for integrating a replacement device into a cluster of devices. The method includes requesting, by the replacement device, a contextual data structure from a first device of the cluster of devices and/or at least one outside device from outside of the cluster of devices. The method includes obtaining, by the replacement device, based on the received contextual data structure, contextual data indicative of an environmental context of the replacement device. The method includes providing, by the replacement device, the contextual data to at least one device of the cluster of devices and/or the at least one outside device. The method includes determining, by the at least one device and/or the at least one outside device, whether the contextual data meets a context criterion of a stored contextual data indicative of contextual data of a replaced device. The method includes, in accordance with the contextual data meeting the context criterion of the stored contextual data, receiving, by the replacement device, from one or more of the first device, the at least one device, and the at least one outside device, state data indicative of a known state of the replaced device. The method includes, in accordance with the contextual data meeting the context criterion of the stored contextual data, updating the replacement device with the state data.

The method may advantageously improve integration of a replacement device into a cluster of devices, such as by speeding up the replacement process. Further, the method may reduce the requirements of a human operator in replacing a device into a cluster of devices, which can reduce the requirements in integrating a new device into a cluster of devices. Moreover, the method can allow for a replacement device to assume the state and operational role of a replaced device.

Further, disclosed herein is a method. The method can be for preparing for replacement of a device in a cluster of devices. The method includes obtaining, by a device in a cluster of devices, contextual data indicative of an environment. The method includes generating, by the device, based on the contextual data, a contextual data structure. The method includes providing, by the device, the contextual data and the contextual data structure to another device in the cluster of devices.

The method may advantageously improve the preparation for integration of a replacement device into a cluster of devices, such as by speeding up the replacement process and eliminating the need for pre-provisioning data to the replacement device. Further, the method may reduce the requirements of a human operator in replacing a device into a cluster of device, which can reduce time, effort and likelihood of errors in integrating a new device into a cluster of devices.

Further, a replacement device is disclosed. The replacement device can be configured to integrate with a cluster of devices. The replacement device includes memory circuitry. The replacement device includes interface circuitry. The replacement device includes processor circuitry. The processor circuitry is configured to request a contextual data structure from a first device of the cluster of devices and/or at least one outside device from outside of the cluster of devices. The processor circuitry is configured to obtain, based on the received contextual data structure, contextual data indicative of an environmental context of the replacement device. The processor circuitry is configured to provide the contextual data to at least one device of the cluster of devices and/or the at least one outside device. The processor circuitry is configured to receive, from one or more of the first device, the at least one device, and the at least one outside device, state data indicative of a known state of a replaced device. The processor circuitry is configured to update the replacement device with the state data.

The replacement device may advantageously improve integration of the replacement device into a cluster of devices, such as by speeding up the replacement process. Further, the replacement device configuration may reduce the requirements of a human operator in integrating the replacement device into a cluster of devices, which can reduce the requirements in integrating a new device into a cluster of devices. Moreover, the replacement device can assume the state and operational role of a replaced device.

Further disclosed is a system. The system comprises a cluster of devices. The cluster of devices comprises a first device. The cluster of devices comprises at least one device. The system comprises at least one outside device from outside of the cluster of devices. The cluster of devices and/or the at least one outside device is configured to provide, by the first device and/or the at least one outside device, to a replacement device, a contextual data structure. The cluster of devices and/or the at least one outside device is configured to receive, by the at least one device and/or the at least one outside device, from the replacement device, contextual data indicative of an environmental context of the replacement device. The cluster of devices and/or the at least one outside device is configured to determine, by the at least one device and/or the at least one outside device, whether the contextual data meets a context criterion of a stored contextual data indicative of contextual data of a replaced device. In accordance with the contextual data meeting the context criterion of the stored contextual data, the system is configured to provide, by one or more of the first device, the at least one device, and/or the at least one outside device, to the replacement device, state data indicative of a known state of the replaced device.

The system may advantageously improve integration of the replacement device into a cluster of devices, such as by speeding up the replacement process. Further, the system reduce the requirements of a human operator in integrating the replacement device into a cluster of devices, which can reduce the requirements in integrating a new device into a cluster of devices. Moreover, the system can allow for a replacement device to assume the state and operational role of a replaced device.

BRIEF DESCRIPTION OF THE DRAWINGS

The above and other features and advantages of the present disclosure will become readily apparent to those skilled in the art by the following detailed description of examples thereof with reference to the attached drawings, in which.

DETAILED DESCRIPTION

Figure 1:
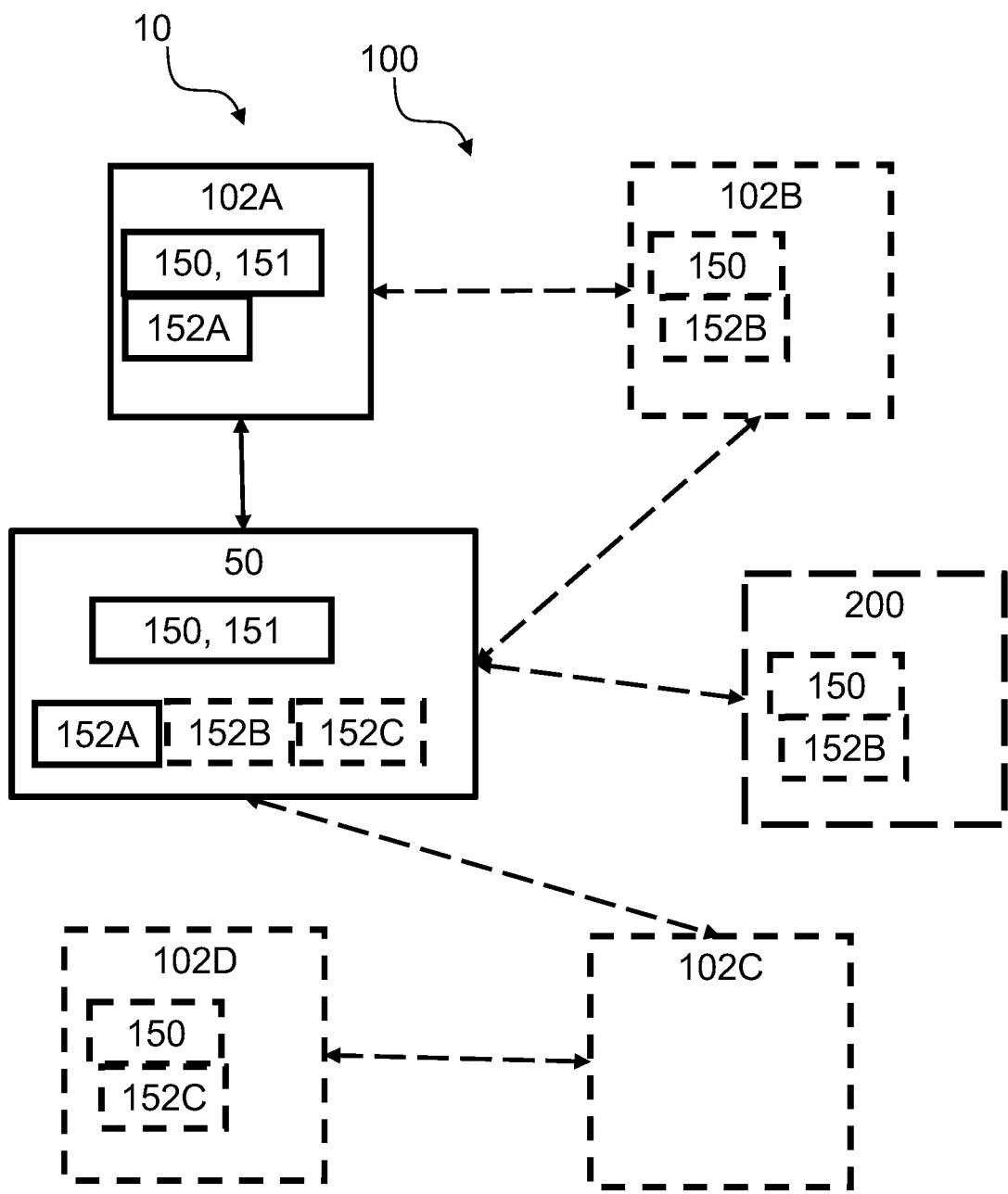
FIG. 1 is a diagram illustrating an example system of integrating a replacement device in a cluster of devices according to this disclosure.

Various examples and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the examples. They are not intended as an exhaustive description of the disclosure or as a limitation on the scope of the disclosure. In addition, an illustrated example needs not have all the aspects or advantages shown. An aspect or an advantage described in conjunction with a particular example is not necessarily limited to that example and can be practiced in any other examples even if not so illustrated, or if not so explicitly described.

Disclosed herein are methods, replacement devices, and systems which can advantageously allow for fast and efficient replacement of a device in a cluster of devices, while minimizing potential errors from a human operator. Advantageously, the methods, replacement devices, and systems disclosed herein can easily allow for a replacement device to assume the state and operational role of a replaced device.

With the present disclosure, a human operator would only have to physically replace the old device with the replacement device. The rest is automatic. This can speed up the replacement process, removes some risk of "human error" and reduces qualifications requirements on the operator.

In one or more example systems, the replacement process as discussed herein may be semi-automatic. For example, the cluster of devices or the replacement device may provide a request to an operator to confirm one or more parameters, such as one or more states, such as state data, of a replacement device. For example, a replacement device can be a "critical" device, such as by having a criticality flag and/or criticality parameter stored thereon. Replacing a critical device may require operator confirmation. For example, a critical device may be one or more of a security camera, a fire alert sensor, and an industrial process monitoring equipment. A critical device may be a device where improper replacement procedures could have significant impact.

All other devices, such as "non-critical" devices, may undergo an automatic process as discussed and does not require operator confirmation. For example, replacement component for a weather station may be considered non-critical.

As used herein, a replaced device may be a device of the cluster of devices, such as a group of connected devices, that is to be removed from the cluster of devices, such as disconnected from the cluster of devices, and/or is being prepared for removal from the cluster of devices and/or has been removed from the cluster of devices. Any device of the cluster of devices may become a replaced device. For example, if a computer in the cluster of devices becomes defective, and thus should be replaced, the computer can be considered a replaced device. A replaced device may be considered an "old" device.

As used herein, a replacement device may be a device to be connected to the cluster of devices. For example, a replacement device may be configured to replace a replaced device of the cluster of devices. The replacement device may be the same type of device as the replaced device, such as both the replacement device and the replaced device being a mobile telephone. The replacement device may be a different type of device as the replaced device, such as both the replacement device being a computer and the replaced device being a mobile telephone. A replacement device may be considered a "new" device. After the replacement device replaces a replaced device, the replacement device may then need to be replaced, and can then be considered a replaced device.

The figures are schematic and simplified for clarity, and they merely show details which aid understanding the disclosure, while other details have been left out. Throughout, the same reference numerals are used for identical or corresponding parts.

Figure 2:
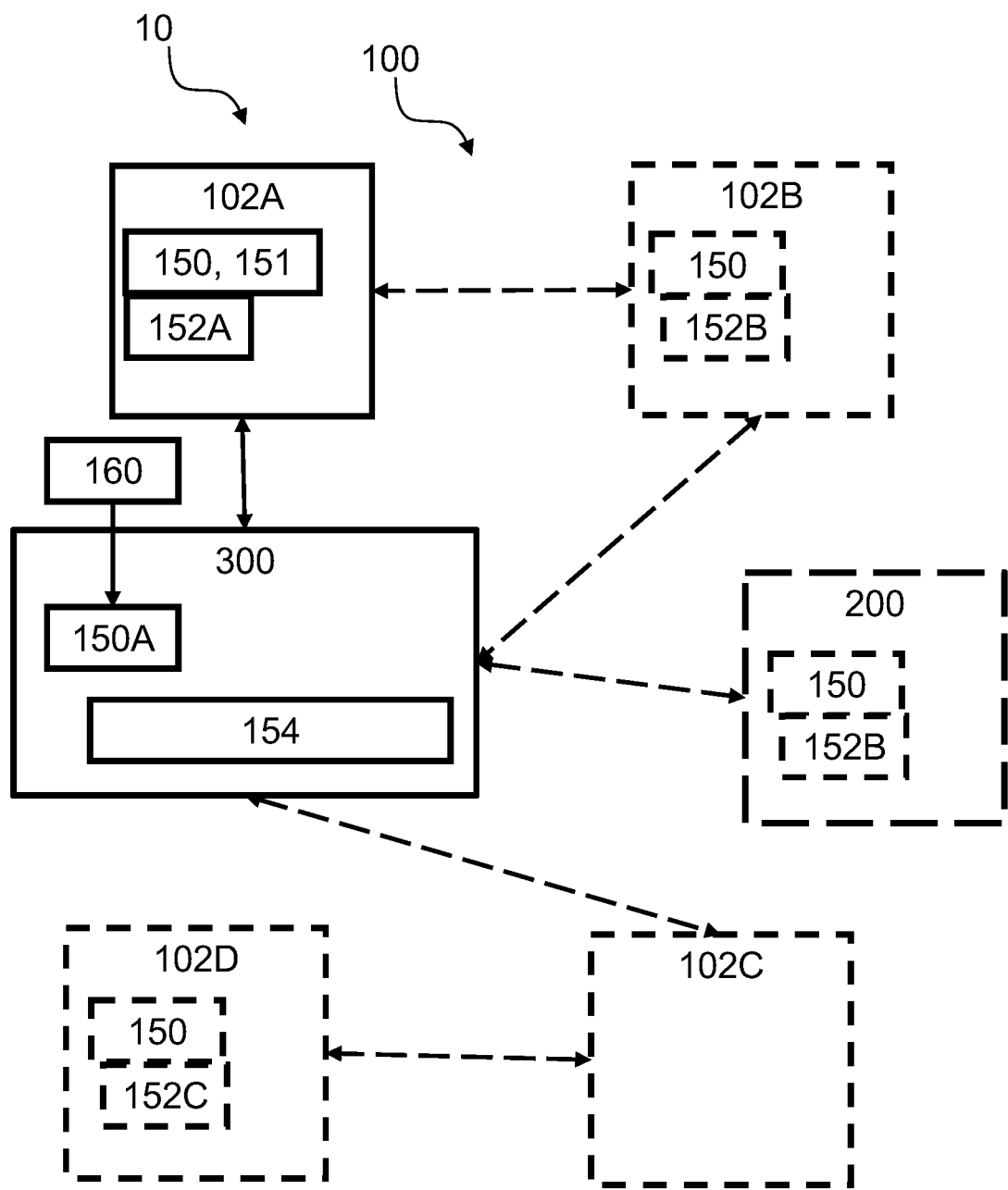
FIG. 2 is a diagram illustrating an example system of integrating a replacement device in a cluster of devices according to this disclosure.
Figure 3:
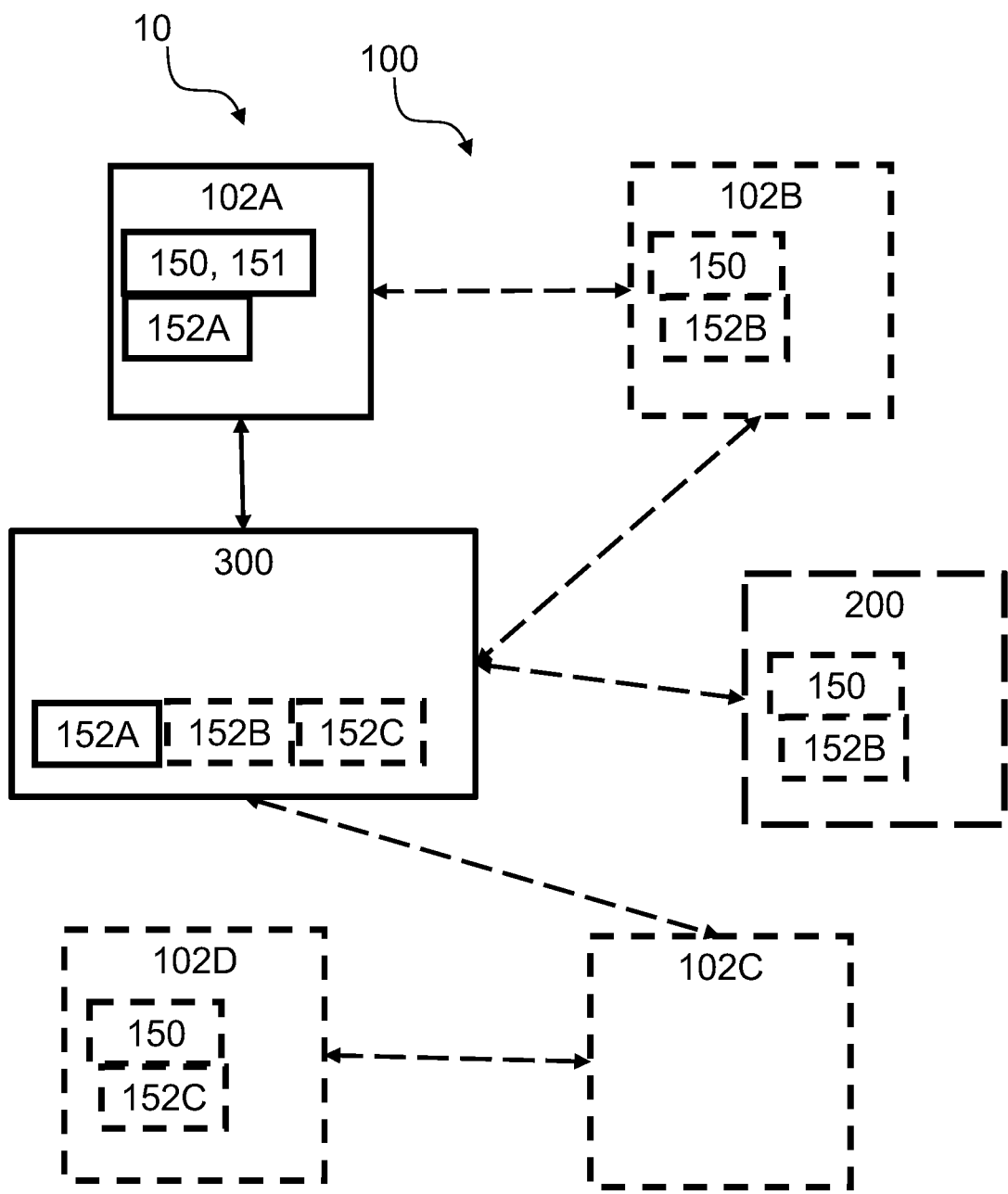
FIG. 3 is a diagram illustrating an example system of integrating a replacement device in a cluster of devices according to this disclosure.

FIGS. 1-3 are diagrams illustrating an example system of integrating a replacement device in a cluster of devices according to this disclosure. FIG. 1 is a diagram illustrating a replaced device 50 in the cluster of devices 100 system 10 prior to being replaced according to this disclosure. FIG. 2 is a diagram illustrating a replacement device 300 being added into the cluster of devices 100 of system 10 after removal of the replaced device 50 according to this disclosure. FIG. 3 is a diagram of illustrating the replacement device 300 being integrated into the cluster of devices 100 of the system 10 according to this disclosure.

As shown in FIGS. 1-3, the cluster of devices can include many different devices, shown as 102A, 102B, 102C, and 102D. Each device 102A, 102B, 102C, 102D of the cluster of devices 100 can be configured to perform any action and/or method discussed with respect to the one device, another device, at least one device, and first device discussed herein.

The disclosed system 10 is configured to automatically identify and provision a replacement device 300 based on contextual data, such as a sensor data fingerprint, and stored state data, such as digital twin information, distributed in the system 500, such as distributed in a local network.

Disclosed is a system 10. In one or more example systems, the system 10 comprises a cluster of devices 100. In one or more example systems, the cluster of devices 100 comprises a first device 102A. In one or more example systems, the cluster of devices 100 comprises at least one device 102A, 102B. In one or more example systems, the system 10 can comprise at least one outside device 200 from outside of the cluster of devices 100. In one or more example systems, the cluster of devices 100 and/or the at least one outside device 200 is configured to provide, by the first device 102A and/or the at least one outside device 200, to a replacement device 300, a contextual data structure 151. In one or more example systems, the cluster of devices 100 and/or the at least one outside device 200 is configured to receive, by the at least one device 102A, 102B and/or the at least one outside device 200, from the replacement device 300, contextual data 150A indicative of an environmental context of the replacement device 300. In one or more example systems, the cluster of devices 100 and/or the at least one outside device 200 is configured to determine, by the at least one device 102A, 102B and/or the at least one outside device 200, whether the contextual data 150A meets a context criterion of a stored contextual data 150 indicative of contextual data of a replaced device 50. In one or more example systems, in accordance with the contextual data 150A meeting the context criterion of the stored contextual data 150, the system 10 is configured to provide, by one or more of the first device 102A, the at least one device 102A, 102B, and/or the at least one outside device 200, to the replacement device 300, state data 152A indicative of a known state of the replaced device 50. In one or more example systems, in accordance with the contextual data 150A not meeting the context criterion of the stored contextual data 150, the system 10 is configured to not provide, by one or more of the first device 102A, the at least one device 102A, 102B, and/or the at least one outside device 200, to the replacement device 300, state data 152A indicative of a known state of the replaced device 50.

As discussed herein, the system 10 can include a cluster of devices 100 and/or at least one outside device 200. As used herein, the cluster of devices 100 and/or the at least one outside device 200 may not use the at least one outside device 200, and all actions and/or methods can be fully performed by the cluster of devices 100. Any use of the cluster of devices 100 and/or the at least one outside device may be read as just reciting the cluster of devices 100.

The role of a device, such as the replacement device 300 and/or the replaced device 50, can be derived from contextual (sensed) data 150A, aggregated into a unique contextual data, such as a fingerprint. In this way explicit identity management can be avoided. The contextual data 150A can be compared to stored contextual data 150 in the cluster of devices 100 of replaced device 50. Upon confirmation that the replacement device 300 can act in the same manner as the replaced device 50, the cluster of devices 100 can provide state data to update the replacement device 300. The replacement device 300 can land in the same context as the replaced device 50, and can efficiently, such as automatically, assume the role of the replaced device 50.

Each device in the cluster of devices 100 can obtain sensor data for the purpose of uniquely identifying the device among all the devices in the cluster of devices 100. A side effect of using contextual data 102A, such as a sensor-based fingerprint, is that it could change over time, so it can be kept updated.

The types and amounts of data to be used for determination of whether contextual data 102A meets or does not meet a context criterion can be agreed between the participating devices to the level where each device can be uniquely identified based on its context. The types and amounts of data to be used for setting up a system 10 and/or a cluster of devices 100. For example, the types and amounts of data does not have to be agreed between the devices of the cluster of devices 100, but can be predetermined by the system 10, such as prior to the removal of the replaced device 50 and/or prior to insertion of the replacement device 300.

The determination of what contextual data is used can be stored in the system 10, such as in the cluster of devices and/or the at least one outside device 200. For example, the contextual data structure 151 can be stored in the operating parameters of the system 10.

In one extreme instance, a single temperature sample may be enough to identify devices. In another instance, a combination of temperature, light, vibration, GNSS and RSSI can be used. The contextual data 102A and/or the context criterion can be renegotiated as needed.

In one or more example systems, the contextual data 102A can be combined into a fingerprint with the property that the difference between two such fingerprints can be quantified and numerically compared to a threshold value or to another difference value. This means that the probability that two fingerprints correspond to the same device can be determined. A normalized vector of sensor values is one representation that can fulfil the requirements. The fingerprint can be re-computed at regular intervals, or when the sensor values used change significantly. The fingerprint can be shared in the cluster of devices 100, for example with a certain redundancy. At one extreme, each device fingerprint can be stored in all other devices of the cluster of devices 100. At the other extreme, it is stored in one other device. As a fingerprint is shared in the cluster of devices 100, high similarity to another device's fingerprint can trigger a renegotiation of the fingerprint structure to avoid the risk of confusing one device with another.

If a device, such as a replaced device 50, needs to be replaced, such as because of a malfunction, upgrade, standard replacement, maintenance, or battery depletion, the stored contextual data 150 stored in other devices in the cluster of devices 100 can be used to identify and provision the replacement device 300 correctly. The replacement device 300 can query the cluster of devices 100 about the contextual data structure 151. The replacement device 300 can query an outside device 200, such as a server, about the contextual data structure 151. The replacement device 300 can collect sensor data and, in certain implementations, generate a contextual fingerprint. The replacement device 300 can broadcast the contextual fingerprint as a "request for provisioning". The cluster of devices 100 that have stored identity and state data 152A, 152B, 152C matching the contextual fingerprint can send this data to the replacement device 300. The replacement device 300 can consolidate and apply the data. The replacement device 300 has now fully replaced the replaced device 50 in the cluster of devices 100.

As discussed herein, a cluster of devices 100 can be considered devices connected in network, such as a local network. A cluster of devices 100 can be considered devices configured to communicate with each other. A cluster of devices 100 may be a single device capable of connecting in a local network with another device. A cluster of devices 100 may be a plurality of interconnected, such as internet of things (IOT) devices. A cluster of devices 100 may be a set of devices that can work together, such as on a local network. In a cluster of devices 100, each device can be aware of at least one other device of the cluster of devices 100. In a cluster of devices 100, each device can be aware of all other device of the cluster of devices 100. In a cluster of devices 100, each device can be configured to, such as having a means to, distinguish a device of the cluster of devices 100 from a device that is not in the cluster of devices 100.

The type of device in the cluster of devices 100 is not limiting. For example, a device in the cluster of devices 100, such as the replaced device 50 and/or replacement device 300, can be one or more of a wireless device, a mobile device, a user equipment, a computer, a mobile phone, a tablet, a television, and a laptop.

In one or more example systems, the at least one device 102A, 102B is the first device 102A.

In one or more example systems, the system 10 is configured to provide, by the replacement device 300 or the first device 102A, a request parameter indicative of a request to approve the replacement device 300 to a user of the cluster of device 100. In accordance with receiving an approval from the user, they system 10 is configured to update the replacement device 300 with the state data 152A. In accordance with not receiving an approval from the user, they system 10 is configured to not update the replacement device 300 with the state data 152A.

For example, the replacement device 300 may only communicate with a single device, which is both the first device 102A and the at least one device. If the single device has the contextual data structure 151, the stored contextual data 150, and/or the state data 152A, the replacement device 300 may not need to communicate with any other devices in the cluster of devices 100.

In one or more example systems, the at least one device 102B is different device in the cluster of devices 100 from the first device 102A.

For example, a first device 102A may retain the contextual data structure 151. A second device 102B, third device 102C, and/or fourth device 102D may retain one or more of the stored contextual data 151 and the state data 152A, 152B, 152C. All state data may be in each of 152A, 152B, and 152C or would be split between. The replacement device 300 may communicate with multiple devices in the cluster of devices 100.

As discussed herein, at least one outside device 200 from outside of the cluster of devices 100 can be used. An at least one outside device 200 can be one or more of a server, a cloud, and a network. An at least one outside device 200 may be a device separate from the cluster of devices. The cluster of devices 100 may be in communication with the at least one outside devices 200.

One or more of the devices in the cluster of devices 100 can store a contextual data structure 151. For example, the first device 102A can store the contextual data structure 151. The contextual data structure 151 may be stored in more than one device in the cluster of devices 100. The contextual data structure 151 may be stored in all of the devices in the cluster of devices 100. A portion of the contextual data structure 151 may be stored in a plurality of devices in the cluster of devices 100.

The replacement device 300 can be configured to request the contextual data structure 151. The replacement device 300 can be configured to request the contextual data structure 151, such as from the first device 100 and/or any device from the cluster of devices 100 and/or the at least one outside device 200. The first device 102A and/or the at least one outside device 200 can be configured to provide, such as transmit, the contextual data structure 151 to the replacement device 300.

The contextual data structure 151 can be indicative of stored contextual data 150 that one or more devices of the cluster of devices 100 can use to determine whether a context criterion is met. The contextual data structure 151 can be a template of stored contextual data 150. The contextual data structure 151 can be indicative of a list of contextual data 150A to be received from the replacement device 300. The contextual data structure 151 can be generated by the replaced device 50 prior to the replaced device 50 being replaced as shown in FIG. 1. The contextual data structure 151 can be generated by a device, such as the first device 102A and/or the at least one device 102A, 102B, in the cluster of devices 100 upon receiving contextual data 150 from the replaced device 50 to be replaced.

Renegotiation of the contextual data structure 151 can be triggered. For example, changes of devices in the cluster of devices 100, such as by joining or leaving devices, can trigger a renegotiation. Significant sensor data variations can trigger a renegotiation.

In one or more example systems, a device in the cluster of devices 100 can be designated a cluster head. The cluster head can have a role of consolidating the contextual data from other devices in the cluster of devices 100.

FIG. 1 illustrates that the replaced device 50 can be configured to provide, such as transmit, one or more of the contextual data structure 151 and contextual data 150 to the cluster of devices 100 and/or the at least one outside device 200. The contextual data structure 151 and contextual data 150 can be stored by one or more of the cluster of devices 100 and/or the at least one outside device 200. Further, the replaced device 50 can be configured to provide, such as transmit, state data 152A, 152B, 152C indicative of a known state of the replaced device 50 to one or more devices of the cluster of devices 100 and/or the at least one outside device 200. The state data 152A, 152B, 152C can be stored by one or more of the cluster of devices 100 and/or the at least one outside device 200.

The contextual data structure 151 can be indicative of the type of contextual data that is in the stored contextual data 150. For example, the contextual data structure 151 can be indicative of temperature data and power data to be received from the replacement device 300 and compared to the stored contextual data 150. The replacement device 300 can then provide temperature data and power data based on the contextual data structure 151. The contextual data structure 151 can be indicative of only temperature data, and the replacement device 300 can provide temperature data based on the contextual data structure 151. The contextual data structure 151 can be indicative of the data required from the replacement device 300 in order to replace the replaced device 50. The contextual data structure 151 may vary depending on the type of device in the cluster of devices 100.

The replacement device 300 can be configured to obtain contextual data 150A based on the contextual data structure 151 as shown in FIG. 2. For example, if the contextual data structure 151 only requires temperature data and light data, the replacement device 300 need only obtain temperature data and light data.

The contextual data 150A can be indicative of an environmental context that the replacement device 300 is experiencing. For example, the replacement device 300 can be configured to obtain contextual data 150A from one or more sensors 160. The contextual data 150A can include sensor data from the one or more sensors 160. The contextual data 150A can include one type of sensor data. The contextual data 150A can include a plurality of types of sensor data. The contextual data 150A can be obtained from one or more of virtual, hybrid, or fused sensors, for example by aggregating, combining and/or processing input from one or more of the more "primitive" or fundamental sensors. The replacement device 300 can be configured to generate and/or build contextual data 150A, such as based on the sensor data received from one or more sensors 160.

In one or more example systems, the contextual data 150A comprises one or more of: temperature data, sensor data, light data, vibration data, received signal strength indicator (RSSI) data, location data, connection data, image data, power output data, and radio data. These are non-limiting examples, and other types of data can be used. For example, the contextual data 150A may include one or more of radiation data, proximity data, pressure data, photoelectric data, particle data, magnetic data, level data, humidity data, gas data, chemical data, force data, flow data, and contact data.

The replacement device 300 can be configured to obtain the contextual data 150A. The replacement device 300 and/or replaced device 500 can be configured to obtain the contextual data 150A through one or more of digital, analogue, and electromechanical interfaces on the replacement device 300 and/or replaced device 50. The contextual data 150A may be quantifiable sensor data, such as sensor readings, that may or may not vary over time. For example, the sensor data can vary in a repeating pattern over time. The contextual data 150A may be one or more quantifiable sensor data, such as sensor readings, that may not vary over time. For example, the sensor data may always be the same, or generally the same.

For example, the contextual data 150A can be indicative of a temperature of an environment that the replacement device 300 is located in. As shown in FIG. 2, the replacement device 300 can be configured to provide the contextual data 150A to at least one device 102A, 102B of the cluster of devices 100 and/or the at least one outside device 200. While certain devices of the cluster of devices 100 are mentioned, any device from the cluster of devices 100 having the stored contextual data 150 can be used.

One or more devices in the cluster of devices 100, such as the first device 102A and/or the at least one device 102A, 102B, and/or the at least one outside device 200 can include stored contextual data 150. The stored contextual data 150 may follow the contextual data structure 151. The stored contextual data 150 may be based on the contextual data structure 151. The contextual data structure 151 may be based on the stored contextual data 150. As shown in FIG. 1, the replaced device 50 can provide, such as transmit, the contextual data structure 151 and/or stored contextual data 150 to any one of the cluster of devices 100 and/or the at least one outside device 200.

The stored contextual data 150 can be indicative of a contextual data of the replaced device 50 that the replacement device 300 is replacing. The stored contextual data 150 may be the same type of data as the contextual data 150A. For example, if the contextual data 150A is indicative of temperature data, the stored contextual data 150 may be indicative of temperature data as well. The type of stored contextual data 150 may be dictated by the contextual data structure 151. This may allow a comparison between the stored contextual data 150 and the contextual data 150A.

The system 10 may determine and/or generate stored contextual data 150 based on a prediction function. The system 10 may include a model to determine and/or train the cluster of devices 100 to determine and/or generate stored contextual data 150.

In one or more example systems, the contextual data 150A comprises a first contextual data indicative of a first environmental context and having a first weight parameter. In one or more example systems, the contextual data comprises a second contextual data indicative of a second environment context and having a second weight parameter.

For example, certain contextual data 150A may weight certain types of data. The first contextual data may be indicative of location data. Location data may be more stable than another type of data, such as power output data. While the contextual data may be indicative of both location data and power output data, the location data may be weighed more heavily. In one or more example systems, the first weight parameter is the same as the second weight parameter. In one or more example systems, the first weight parameter is different than the second weight parameter.

The at least one device 102A, 1026 and/or the at least one outside device 200 can be configured to determine whether the contextual data 150A meets a context criterion of the stored contextual data 150. Any device of the cluster of devices 100 can be configured to determine whether the contextual data 150A meets a context criterion of the stored contextual data 150

The context criterion may be a context threshold. For example, if the contextual data 150A is indicative of temperature data above the context threshold, the at least one device 102A, 102B and/or the at least one outside device 200 is configured to determine that the contextual data 150A does not meet the context criterion. If the contextual data 150A is indicative of temperature data at or below the context threshold, the at least one device 102A, 102B and/or the at least one outside device 200 is configured to determine that the contextual data 150A does meet the context criterion.

The context criterion may include a range of values, such as a minimum value and a maximum value. For example, if the contextual data 150A is indicative of temperature data at or above a minimum value and at or below a maximum value, the at least one device 102A, 102B and/or the at least one outside device 200 is configured to determine that the contextual data 150A does meet the context criterion. If the contextual data 150A is indicative of temperature data below a minimum value or above a maximum value, the at least one device 102A, 102B and/or the at least one outside device 200 is configured to determine that the contextual data 150A does not meet the context criterion.

The at least one device 102A, 102B and/or the at least one outside device 200 can use match scoring to determine whether the contextual data 150A meets the context criterion.

The context criterion allows some flexibility with the comparison of the contextual data 150A to the stored contextual data 150. For example, the contextual criterion does not need to be exactly that of the stored contextual data 150. The contextual criterion can allow for differentiation of devices in the cluster of devices 100. The contextual data 150A need not be a cryptographic key with respect to the stored contextual data 150.

The contextual criterion may be varied depending on the type of contextual data 150A used. For example, temperature may have more movement than location, and the contextual criterion for temperature may have a larger range than that of location.

In one or more example systems, the system 10 comprises the replacement device 300. In one or more example systems, the system 10 does not comprise the replacement device 300. In one or more example systems, the system 10 comprises the replaced device 50. In one or more example systems, the system 10 does not comprise the replaced device 50.

In one or more example systems, the replacement device 300 is configured to update based on the state data 152A, 152B, 152C.

In accordance with the at least one device 102A, 102B and/or the at least one outside device 300 determining that the contextual data 150A meets the context criterion, the replacement device 300 is considered an adequate replacement for the replaced device 50. The cluster of devices 100 and/or the at least one outside device 300 is then configured to provide state data 152A, 152B, 152C indicative of a known state of the replaced device 50, as shown in FIG. 2. Any device of the cluster of devices 100 and/or the at least one outside device 300 is configured to provide state data 152A, 152B, 152C indicative of a known state of the replaced device 50 to the replacement device 300.

The replacement device 300 can be configured receive the state data 152A, 152B, 152C and update from its default data 154 to the state data 152A, 152B, 152C. The replacement device 300 can then act as the replaced device 50 without requiring any additional user input, as shown in FIG. 3, where the replacement device 300 now includes the state data 152A, 152B, 152C of the replaced device 50. If the replacement device 300 were needed to be replaced, it can become the replaced device of FIG. 1.

For example, the replacement device 300 may receive state data 152A, 152B, 152C indicative of a known state of the replaced device 50. In one or more exemplary systems, the replacement device 300 may receive the state data 152A, 152B, 152C with the contextual data 150A, which may allow the replacement device 300 to verify that all pieces of the state data 152A, 152B, 152C belong together.

The state data 152A, 152B, 152C may be indicative of a last known state of the replaced device 50. The state data 152A, 152B, 152C may be indicative of a previous state data of the replaced device 50. The state data 152A, 152B, 152C may be indicative of recent state data of the replaced device 50. The state data 152A, 152B, 152C may be indicative of ideal state data of the replaced device 50. The state data 152A, 152B, 152C may be stored in a single device of the cluster of devices 100, such as the first device 102A and/or the at least one device 102A, 102B and/or the at least one outside device 300. The state data 152A, 152B, 152C may be stored in a plurality of devices in the cluster of devices 100. The state information 152A, 152B, 152C can be stored redundantly, such as in multiple devices of the cluster of devices 100, for increased robustness. The replacement device 300 may be configured to request state data 152A, 152B, 152C from one or more of the first device 102A, the at least one device 102A, 102B, and the at least one outside device 200. This can be known as a request for provisioning.

Together with the stored contextual data 150, state data 152A, 152B, 152C, such as state information, such as a digital twin, of the replaced device 50 can be stored in one or more devices of the cluster of devices 100 and/or the at least one outside device 200. The stored contextual data 150 and state data 152A, 152B, 152C can be refreshed, such as updated, independently of each other.

The state data 152A, 152B, 152C can be one or more of a configuration, cached sensor data, locally trained machine learning models, software, and certificates of the replaced device 50. The state data 152A, 152B, 152C can be enough to reconstruct the state of the replaced device 50 to the point where the replacement device 300 operates at the required functional level of the replaced device 50. The particular type of information in the state data 152A, 152B, 152C is not limiting.

For example, a replaced device 50 can obtain context data 150 indicative of a measured temperature for transmission over a secure MQTT connection. The state data 152A, 152B, 152C can be data indicative of one or more of temperature sensor configurations, such as sample frequency, sample time, precision, MQTT server address and port, credentials for setting up a transport layer security (TLS) connection to a server, such as a private key and/or certificate, and a MQTT topic string to use for reporting the measured temperatures.

In one or more example systems, a first portion of the state data 152A, 152B, 152C is provided from one device of the cluster of devices 100 or the at least one outside device 200. In one or more example systems, a second portion of the state data 152A, 152B, 152C is provided from another device of the cluster of devices 100. In one or more example systems, the one device is different from the another device.

For example, as shown in FIG. 2, the state data 152A, 152B, 152C can be split into multiple portions, such as sections and/or pieces, that are distributed separately to devices in the cluster of devices 100 and/or the at least one outside device 300 to balance the storage load in the cluster of devices and/or reduce message payload sizes. As shown, a first portion of state data 152A can be stored in device 102A of the cluster of devices 100. A second portion of state data 152B can be stored in both the at least one outside device 200 and device 102B of the cluster of devices 100. A third portion of state data 152C can be stored in device 102D of the cluster of devices 100. Device 102C of the cluster of devices 100 may not store state data 152A, 152B, 152C and/or stored contextual data 150, but may act as an intermediary with the replacement device 300.

The one device may be the first device 102A. The one device may be the at least one device 102A, 102B. The one device may be different from the first device 102A and the at least one device 102A, 102B. The one device may be known as a third device of the cluster of devices 100, such as device 102C. The another device may be the first device 102A. The another device may be the at least one device 102A, 102B. The another device may be different from the first device 102A and the at least one device 102A, 102B. The another device may be known as a fourth device of the cluster of devices 100, such as device 102D.

State data 152A, 152B, 152C can be stored in an at least one outside device 200, such as in network and/or cloud storage. State data 152A, 152B, 152C can be stored in the cluster of devices 100. For example, storing state data 152A, 152B, 152C in the cluster of devices 100, such as known as local storage, can be advantageous for data privacy and/or connectivity to the internet could be intermittent, bandwidth limited, often the case in low-power networks, or non-existent, such as in remote or secure locations.

The robustness of the system 10 can be scaled by the level of redundancy that can be afforded, such as communication bandwidth/power and storage space cost in the devices of the cluster of devices 100. At the extreme end, all devices in the cluster of devices 100 can store the stored contextual data 150 and complete state data 152A, 152B, 152C of all other devices in the cluster of devices 100. Thus, only one operational device of the cluster of devices 100 is required to replace all other devices seamlessly. If complete states can just be recovered, there is no other theoretical limit to the number of devices that can be replaced at the same time.

In one or more example systems, the replacement device 300 is configured to provide the contextual data 150A to a first device 102A of the cluster of devices 100 and/or the at least one outside device 200. In one or more example systems, to provide the contextual data 150A comprises to generate, based on the contextual data structure 151 and contextual data 150A, a contextual fingerprint. In one or more example systems, the contextual data 150A comprises the contextual fingerprint.

In one or more example systems, a contextual fingerprint can be an algorithm calculated over a data set to identify the data set. The contextual fingerprint can be used to easily compare similarity of context of different devices. For example, an outcome of the contextual fingerprint generation is a definition of an N-dim volume, for example which may have a size 0, i.e. a point.

For example, determining whether the contextual data 150A meets a context criterion of stored contextual data 150 can include determining whether the contextual fingerprint meets a context criterion of a stored contextual fingerprint.

A device of the cluster of devices 100, such as a replaced 50 and/or a replacement device 300, may have a contextual fingerprint. In certain implementations, each device in the cluster of devices 100 generates a fingerprint based on contextual data. The devices may generate a fingerprint based such as one or more of sensor values, location, radio parameters. The operational state of each device is stored together with this fingerprint, in peer devices or in a network/cloud storage unit. The contextual fingerprint can be negotiated to obtain a sufficiently unique fingerprint with as little resource consumption as possible.

For example, when a replaced device 50 is replaced, the replacement device 300 can generate, such as compute, its contextual fingerprint and can request one or more devices in the cluster of devices 10 storing state data 152A, 152B, 152C to supply the saved state of the replaced device 50, based on meeting the context criterion, such as a by matching the fingerprint.

In one or more example systems, a hash would not represent the contextual fingerprint as the the hash would require a perfect match, while points could be matched using shortest distance.

In one or more example systems, the at least one device 102A, 102B and/or the at least one outside device 200 can determine whether the contextual data 150A meets a context criterion by reaching a consensus of the contextual fingerprint through producing non-overlapping N-dimensional matching volumes for each device in the cluster of devices 100. Those volumes could be asymmetric and would be determined to meet the context criterion as soon as an N-dimensional point falls inside the volume, as opposed to the shortest distance matching, where everything is symmetric. This approach could have one type of contextual fingerprint (the N-dim volume) matched with another type of contextual fingerprint (the N-dim point). An N-dim volume could be defined using a DNN, SVM, voxels, etc. In one or more example systems, volumes can be non-overlapping to avoid ambiguity.

In one or more example systems, the replacement device 300 is configured to obtain updated contextual data. In one or more example systems, the replacement device 300 is configured to generate, based on the updated contextual data, an updated contextual fingerprint. In one or more example systems, the replacement device 300 is configured to provide the updated contextual fingerprint to the at least one device 102A, 102b of the cluster of devices 100 and/or the at least one outside device 200. In one or more example systems, the at least one device 102A, 102b and/or the at least one outside device 200 is configured to update the stored contextual data to the updated contextual fingerprint.

For example, the environment of the replacement device may change. The replaced device 50 and/or replacement device 300 could be moved, connected in a different fashion, or experience seasonal temperature changes. Therefore, it may be advantageous to update the stored contextual data 150 in the at least one device 102A, 102b of the cluster of devices 100 and/or the at least one outside device 200. The updating of the stored contextual data 150 may occur after the replacement device 300 has received the state data 152A, 152B, 152C and updated. Further, any device of the cluster of devices 100 may be configured to provide updated contextual data and/or updated contextual fingerprints. The replacement device 300 may be configured to obtain updated contextual data using the one or more sensors 160, such as discussed with respect to obtaining sensor data 150A.

In one or more example systems, to generate the updated contextual fingerprint comprises to generate the updated contextual fingerprint at a time interval.

For example, the replacement device 300 can be configured to generate the updated contextual fingerprint at particular times. Generating the updated contextual fingerprint at a time interval can allow for the cluster of devices to have continuously updated stored contextual data. Time intervals may be, for example, one or more of every second, every minute, every day, every week, every month, and every year.

In one or more example systems, to generate an updated contextual fingerprint comprises to determine whether the updated contextual data meets an update criterion of the contextual fingerprint. In one or more example systems, to generate an updated contextual fingerprint comprises, in accordance with the updated contextual data meeting the update criterion, to provide the updated contextual fingerprint. In one or more example systems, to generate an updated contextual fingerprint comprises, in accordance with the updated contextual data not meeting the update criterion, to not provide the updated contextual fingerprint.

For example, the update criterion can include a contextual threshold. In one or more exemplary systems, the replacement device 300 may determine whether the contextual data 150A is outside of a contextual threshold. In accordance with a determination that the contextual data 150A is outside of the contextual threshold, the replacement device 300 can determine that the update criterion is met. In accordance with a determination that the contextual data 150A is not outside of the contextual threshold, the replacement device 300 can determine that the update criterion is not met. The replacement device 300 can be configured to obtain the updated contextual data. In accordance with a determination that the contextual data 150A is not outside of the contextual threshold, the replacement device 300 can be configured to not obtain the updated contextual data.

In one or more example systems, the at least one device 102A, 102B and/or the at least one outside device 200 is configured to determine whether the contextual data 150A meets a stored contextual criterion of a stored contextual data indicative of contextual data of a non-replaced device of the cluster of devices 100. In one or more example systems, the at least one device 102A, 102B and/or the at least one outside device 200 is configured to, in accordance with determining that the contextual data 150A meets the stored contextual criterion, update the contextual data structure 151. In one or more example systems, the at least one device 102A, 102B and/or the at least one outside device 200 is configured to, in accordance with determining that the contextual data 150A does not meet the stored contextual criterion, not update the contextual data structure 151.

For example, two devices of the cluster of devices 100 may have similar contextual data. The at least one device 102A, 102B and/or the at least one outside device 200 may store contextual data 150 of the replaced device 50 as well as one or more other devices in the cluster of devices 100. As the contextual data 150A may not be the exact same as the stored contextual data 150, the at least one device 102A, 102B and/or the at least one outside device 200 may determine that the contextual data 150A meets a stored contextual criterion of a stored contextual data indicative of contextual data of a non-replaced device of the cluster of devices. The cluster of devices 100 and/or the at least one outside device 200 would not "know" which device the replacement device 300 was meant to replace, either the replaced device 50 or the non-replaced device.

In order to avoid improperly replacing a non-replaced device with the replacement device 300, the cluster of devices 100 and/or the at least one outside device 200 can determine whether the contextual data 150A meets the stored contextual criterion.

In accordance with a determination the stored contextual criterion is met, the at least one device 102A, 102B and/or the at least one outside device 200 can update the contextual data structure 151. The at least one device 102A, 102B and/or the at least one outside device 200 can provide the contextual data structure 151 that has been updated to the replacement device 300. The replacement device 300 can be configured to update contextual data based on the contextual data structure that has been updated. This process can continue until the contextual data does not meet the stored contextual criterion, meaning that the replacement device 300 is properly replacing the replaced device 50.

In one or more example systems, in accordance with the contextual data 150A meeting the context criterion of the stored contextual data 150, the replacement device 300 is configured to provide an output parameter indicative of the contextual data 150A meeting the context criterion. In one or more example systems, in accordance with the contextual data 150A not meeting the context criterion of the stored contextual data 150, the replacement device 300 is configured to not provide an output parameter indicative of the contextual data 150A meeting the context criterion.

The system 10, such as the replacement device 300 or any device of the cluster of devices 100, may transmit the output data in order to operate a light, such as an LED, such as flashing. The system 10, such as the replacement device 300 or any device of the cluster of devices 100, may transmit the output data in order to provide a user with output, such as via an application. The system 10, such as the replacement device 300 or any device of the cluster of devices 100, may transmit the output data to a cloud, which may provide feedback to an operator that can be, for example, visualized in a dashboard and/or a log database.

In one or more example systems, the contextual data structure 151 and/or the stored contextual data 150 is stored in a plurality of devices of the cluster of devices 100 and/or the at least one outside device 200.

For example, redundancy can be increased by having the contextual data structure 151 and/or the stored contextual data 150 stored in multiple devices.

The contextual data structure 151 may be stored in one device of the cluster of devices 100. The contextual data structure 151 may be stored in a plurality of devices of the cluster of devices 100.

The stored contextual data 150 may be stored in one device of the cluster of devices 100. The stored contextual data 150 may be stored in a plurality of devices of the cluster of devices 100.

Figure 4A:
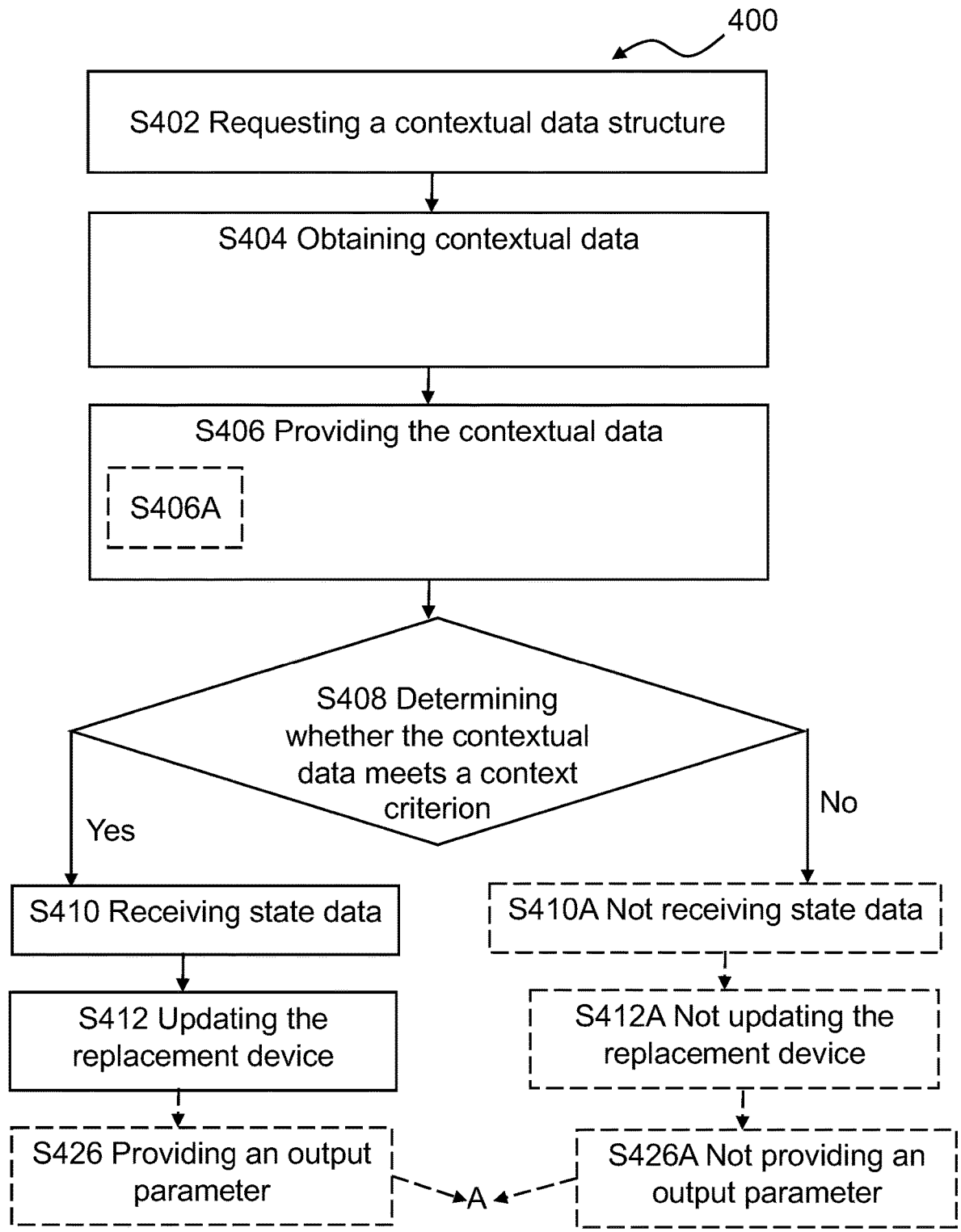
FIGS. 4A-B are a flow-chart illustrating an example method of integrating a replacement device in a cluster of devices according to this disclosure.
Figure 4B:
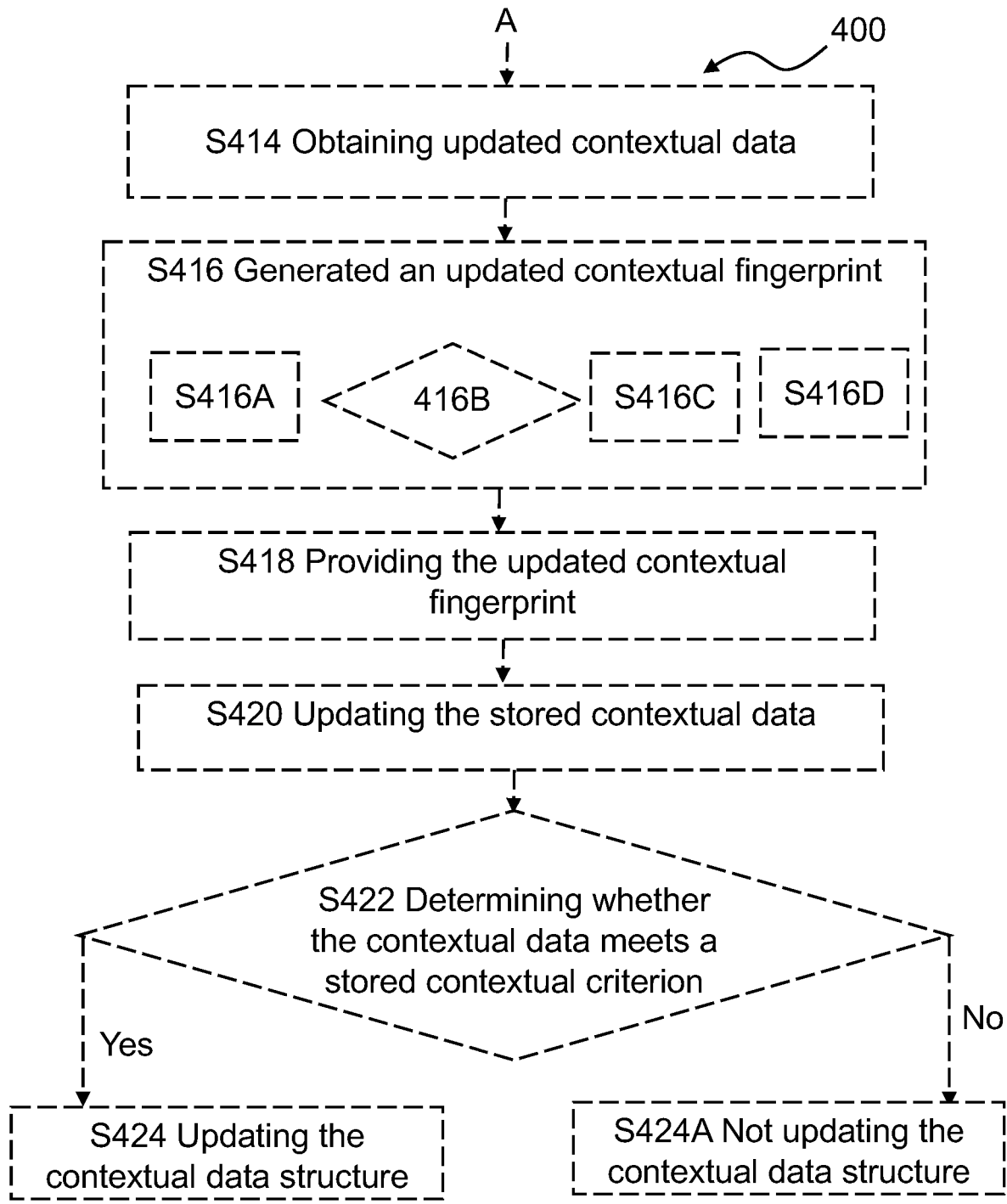

FIGS. 4A-4B shows a flow diagram of an example method 400, performed by a system according to the disclosure, integrating a replacement device in a cluster of devices. A replacement device of the cluster of devices can be the replacement device 300 discussed in FIG. 6.

FIGS. 4A-4B illustrate a method 400. The method 400 is for integrating a replacement device into a cluster of devices. In one or more example methods, the method 400 includes requesting S402, by the replacement device, a contextual data structure from a first device of the cluster of devices and/or at least one outside device from outside of the cluster of devices. In one or more example methods, the method 400 includes obtaining S404, by the replacement device, based on the received contextual data structure, contextual data indicative of an environmental context of the replacement device. In one or more example methods, the method 400 includes providing S406, by the replacement device, the contextual data to at least one device of the cluster of devices and/or the at least one outside device. In one or more example methods, the method 400 includes determining S408, by the at least one device and/or the at least one outside device, whether the contextual data meets a context criterion of a stored contextual data indicative of contextual data of a replaced device. In one or more example methods, the method 400 includes, in accordance with the contextual data meeting the context criterion of the stored contextual data, receiving S410, by the replacement device, from one or more of the first device, the at least one device, and the at least one outside device, state data indicative of a known state of the replaced device. In one or more example methods, the method 400 includes, in accordance with the contextual data meeting the context criterion of the stored contextual data, updating S412 the replacement device with the state data.

In one or more example methods, the method 400 includes removing the replaced device from the cluster of devices.

In one or more example methods, the method 400 includes, in accordance with the contextual data not meeting the context criterion of the stored contextual data, not receiving S410A, by the replacement device, from one or more of the first device, the at least one device, and the at least one outside device, state data indicative of a known state of the replaced device. In one or more example methods, the method 400 includes, in accordance with the contextual data not meeting the context criterion of the stored contextual data, not updating S412A the replacement device with the state data.

In one or more example methods, a first portion of the state data is received from one device of the cluster of devices or the at least one outside device. In one or more example methods, a second portion of the state data is received from another device of the cluster of devices, wherein the one device is different from the another device.

In one or more example methods, the contextual data comprises one or more of: temperature data, sensor data, light data, vibration data, received signal strength indicator (RSSI) data, location data, connection data, image data, power output data, and radio data.

In one or more example methods, the contextual data comprises a first contextual data indicative of a first environmental context and having a first weight parameter. In one or more example methods, the contextual data comprises a second contextual data indicative of a second environment context and having a second weight parameter.

In one or more example methods, providing S406 the contextual data comprises generating S406A, based on the contextual data structure and contextual data, a contextual fingerprint. In one or more example methods, the contextual data comprises the contextual fingerprint.

In one or more example methods, the method 400 comprises obtaining S414, by the replacement device, updated contextual data. In one or more example methods, the method 400 comprises generating S416, based on the updated contextual data, an updated contextual fingerprint. In one or more example methods, the method 400 comprises providing S418 the updated contextual fingerprint to the at least one device and/or the at least one outside device. In one or more example methods, the method 400 comprises updating S420, by the at least one device and/or the at least one outside device, the stored contextual data to the updated contextual fingerprint.

In one or more example methods, generating S416 the updated contextual fingerprint comprises generating S416A the updated contextual fingerprint at a time interval.

In one or more example methods, generating S416 an updated contextual fingerprint comprises determining S416B whether the updated contextual data meets an update criterion of the contextual fingerprint. In one or more example methods, generating S416 an updated contextual fingerprint comprises, in accordance with the updated contextual data meeting the update criterion, providing S416C the updated contextual fingerprint. In one or more example methods, generating S416 an updated contextual fingerprint comprises, in accordance with the updated contextual data not meeting the update criterion, not providing S416D the updated contextual fingerprint.

In one or more example methods, the method 400 comprises determining, S422 by the at least one device and/or the at least one outside device, whether the contextual data meets a stored contextual criterion of a stored contextual data indicative of contextual data of a non-replaced device of the cluster of devices. In one or more example methods, the method 400 comprises, in accordance with determining that the contextual data meets the stored contextual criterion, S424 updating the contextual data structure. In one or more example methods, the method 400 comprises, in accordance with determining that the contextual data does not meet the stored contextual criterion, S424A not updating the contextual data structure.

In one or more example methods, the contextual data structure and/or the stored contextual data is stored in a plurality of devices of the cluster of devices and/or the at least one outside device.

In one or more example methods, in accordance with the contextual data meeting the context criterion of the stored contextual data, the method 400 comprises providing S426, by the replacement device, an output parameter indicative of the contextual data meeting the context criterion. In one or more example methods, in accordance with the contextual data not meeting the context criterion of the stored contextual data, the method 400 comprises not providing S426A, by the replacement device, an output parameter indicative of the contextual data meeting the context criterion.

In one or more example methods, the at least one device is the first device.

In one or more example methods, the at least one device is different device in the cluster of devices from the first device.

In one or more example methods, the method 400 includes providing, by the replacement device or the first device, a request parameter indicative of a request to approve the replacement device to a user of the cluster of device. In accordance with receiving an approval from the user, the method 400 includes updating the replacement device with the state data. In accordance with not receiving an approval from the user, the method 400 includes not updating the replacement device with the state data.

Figure 5:
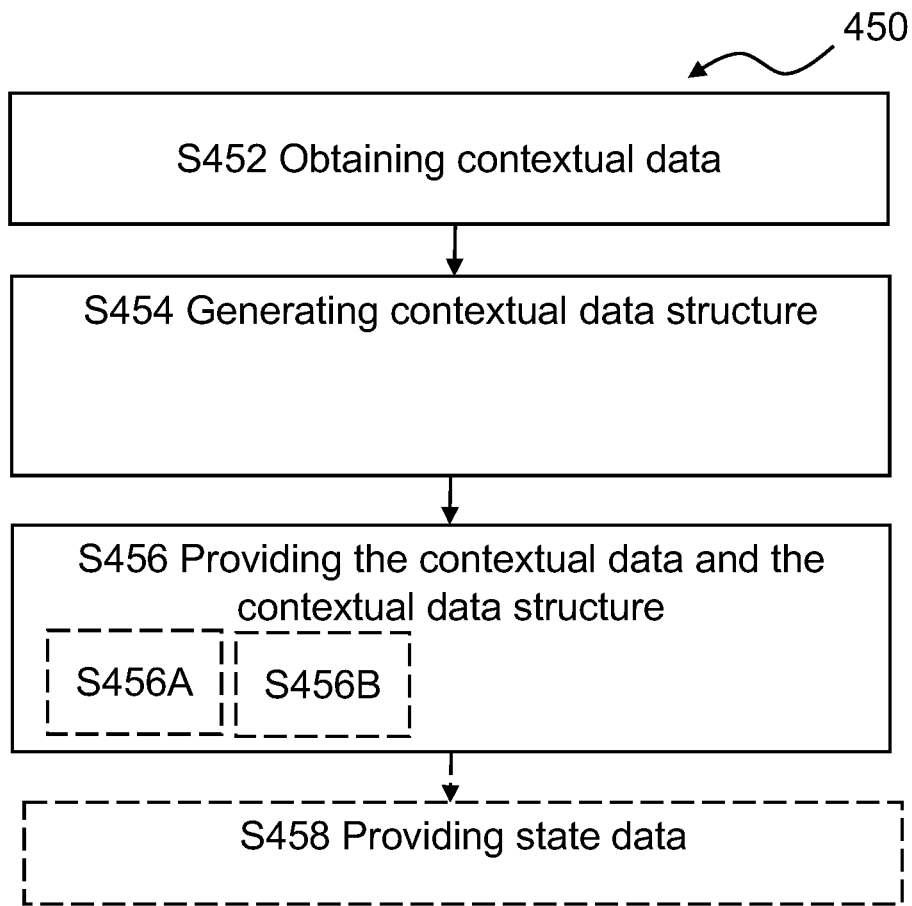
FIG. 5 is a flow-chart illustrating an example method of preparing for replacement of a device in a cluster of devices according to this disclosure.

FIG. 5 shows a flow diagram of an example method 450, performed by a cluster of devices according to the disclosure, for preparing for replacement of a device in a cluster of devices. Further disclosed is a cluster of devices configured to perform the methods disclosed in FIG. 5.

FIG. 5 shows a method 450. The method 450 can be for preparing for replacement of a device in a cluster of devices. In one or more example methods, the method 450 includes obtaining S452, by a device in a cluster of devices, contextual data indicative of an environment. In one or more example methods, the method 450 method includes generating S454, by the device, based on the contextual data, a contextual data structure. In one or more example methods, the method 450 method includes providing S456, by the device, the contextual data and the contextual data structure to another device in the cluster of devices.

In one or more example methods, providing S456 the contextual data and the contextual data structure comprises providing S456A the contextual data and the contextual data structure to the another device in the cluster of devices.

In one or more example methods, the contextual data comprises one or more of: temperature data, sensor data, light data, vibration data, received signal strength indicator (RSSI) data, location data, connection data, image data, power output data, and radio data.

In one or more example methods, the contextual data comprises a first contextual data indicative of a first environmental context and having a first weight parameter, and a second contextual data indicative of a second environment context and having a second weight parameter.

In one or more example methods, the method 452 comprises providing S458, by the device, state data indicative of a known state of the device to the another device and/or the at least one outside device.

In one or more example methods, providing S456 the contextual data comprises generating S456A, based on the contextual data structure and contextual data, a contextual fingerprint. In one or more example methods, the contextual data comprises the contextual fingerprint.

In one or more example methods, the contextual data structure and/or the contextual data is provided to a plurality of devices of the cluster of devices and/or the at least one outside device.

Figure 6:
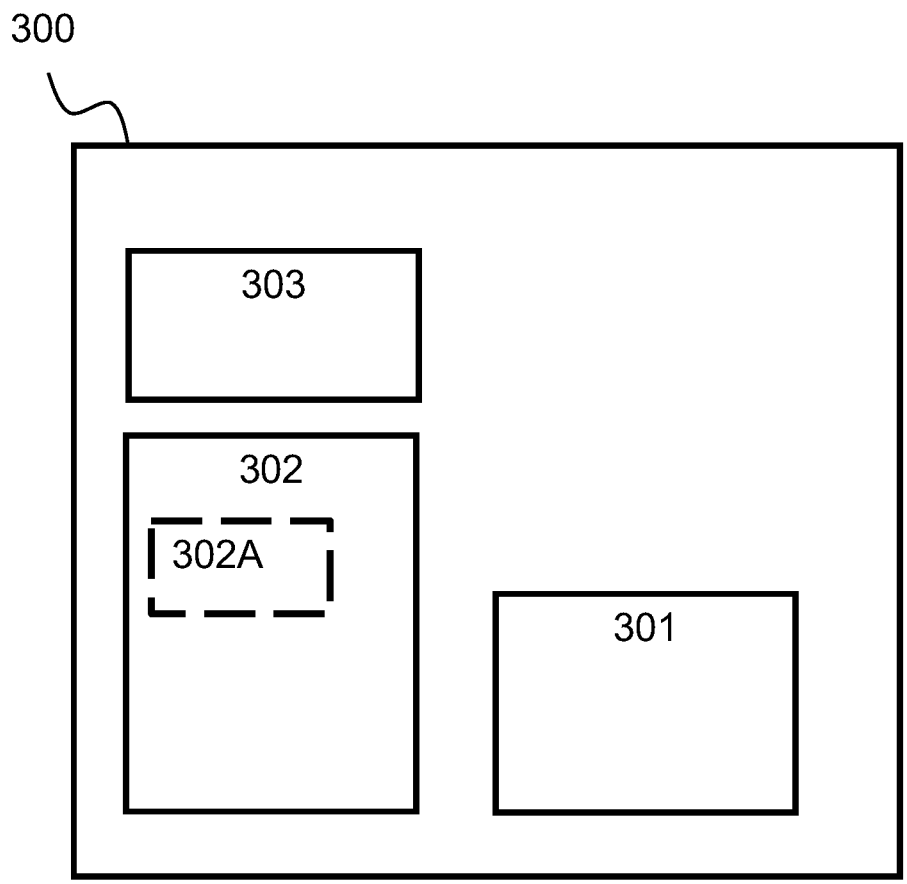
FIG. 6 is a block diagram illustrating an example replacement device according to this disclosure.

FIG. 6 shows a block diagram of an example replacement device 300 according to the disclosure. The replacement device 300 shown in FIG. 6 may also be a replaced device 50. The replacement device 300 shown in FIG. 6 may be any device in the cluster of devices 100, such as first device 102A and/or the at least one device 102A, 102B. The replacement device 300 comprises memory circuitry 301, processor circuitry 302, and an interface circuitry 303. The replacement device 300 may be configured to perform any of the methods disclosed in FIG. 4A-4B. In other words, the replacement device 300 may be configured for integration with a cluster of devices 100.

The replacement device 300 is optionally configured to perform any of the operations disclosed in FIGS. 4A-4B (such as any one or more of S402, S404, S406, S410, S412, S414, S416, S418, S426). The replacement device 300 is optionally configured to perform any of the operations disclosed in FIG. 5 (such as any one or more of S452, S454, S456, S458). The operations of the replacement device 300 may be embodied in the form of executable logic routines (for example, lines of code, software programs, etc.) that are stored on a non-transitory computer readable medium (for example, memory circuitry 301) and are executed by processor circuitry 302).

Furthermore, the operations of the replacement device 300 may be considered a method that the replacement device 300 is configured to carry out. Also, while the described functions and operations may be implemented in software, such functionality may also be carried out via dedicated hardware or firmware, or some combination of hardware, firmware and/or software.

Memory circuitry 301 may be one or more of a buffer, a flash memory, a hard drive, a removable media, a volatile memory, a non-volatile memory, a random access memory (RAM), or other suitable device. In a typical arrangement, memory circuitry 301 may include a non-volatile memory for long term data storage and a volatile memory that functions as system memory for processor circuitry 302. Memory circuitry 301 may exchange data with processor circuitry 302 over a data bus. Control lines and an address bus between memory circuitry 301 and processor circuitry 302 also may be present (not shown in FIG. 6). Memory circuitry 301 is considered a non-transitory computer readable medium.

Memory circuitry 301 may be configured to store information (such as information indicative of second set of paging resources) in a part of the memory.

A replacement device 300 is disclosed. In one or more example replacement devices, the replacement device 300 can be configured to integrate with a cluster of devices. In one or more example replacement devices, the replacement device 300 includes memory circuitry 301. In one or more example replacement devices, the replacement device 300 includes interface circuitry 303. In one or more example replacement devices, the replacement device 300 includes processor circuitry 302. In one or more example replacement devices, the processor circuitry 302 is configured to request a contextual data structure from a first device of the cluster of devices and/or at least one outside device from outside of the cluster of devices. In one or more example replacement devices, the processor circuitry 302 is configured to obtain, based on the received contextual data structure, contextual data indicative of an environmental context of the replacement device 300. In one or more example replacement devices, the processor circuitry 302 is configured to provide the contextual data to at least one device of the cluster of devices and/or the at least one outside device. In one or more example replacement devices, the processor circuitry 302 is configured to receive, from one or more of the first device, the at least one device, and the at least one outside device, state data indicative of a known state of a replaced device. In one or more example replacement devices, the processor circuitry 302 is configured to update the replacement device 300 with the state data.

In one or more example replacement devices, a first portion of the state data is received from one device of the cluster of devices or the at least one outside device. In one or more example replacement devices, a second portion of the state data is received from another device of the cluster of devices, wherein the one device is different from the another device.

In one or more example replacement devices, the contextual data comprises one or more of: temperature data, sensor data, light data, vibration data, received signal strength indicator (RSSI) data, location data, connection data, image data, power output data, and radio data.

In one or more example replacement devices, the contextual data comprises a first contextual data indicative of a first environmental context and having a first weight parameter. In one or more example replacement devices, the contextual data comprises a second contextual data indicative of a second environment context and having a second weight parameter.

In one or more example replacement devices, to provide the contextual data comprises to generate, based on the contextual data structure and contextual data, a contextual fingerprint. In one or more example replacement devices, the contextual data comprises the contextual fingerprint.

In one or more example replacement device, the processor circuitry 302 is configured to obtain updated contextual data. In one or more example replacement device, the processor circuitry 302 is configured to generate, based on the updated contextual data, an updated contextual fingerprint. In one or more example replacement device, the processor circuitry 302 is configured to provide the updated contextual fingerprint to the at least one device and/or the at least one outside device.

In one or more example replacement devices, to generate the updated contextual fingerprint comprises to generate the updated contextual fingerprint at a time interval.

In one or more example replacement devices, to generate an updated contextual fingerprint comprises to determine whether the updated contextual data meets an update criterion of the contextual fingerprint. In one or more example replacement devices, to generate an updated contextual fingerprint comprises, in accordance with the updated contextual data meeting the update criterion, to provide the updated contextual fingerprint.

In one or more example replacement devices, the at least one device is the first device.

In one or more example replacement devices, the at least one device is different device in the cluster of devices from the first device.

In one or more example replacement devices, the replacement device 300 is the same type of device as the replaced device.

Examples of methods and products (replacement device, system) according to the disclosure are set out in the following items:

Item 1. A method of integrating a replacement device in a cluster of devices, the method comprising:
requesting, by the replacement device, a contextual data structure from a first device of the cluster of devices and/or at least one outside device from outside of the cluster of devices;

obtaining, by the replacement device, based on the received contextual data structure, contextual data indicative of an environmental context of the replacement device;

providing, by the replacement device, the contextual data to at least one device of the cluster of devices and/or the at least one outside device; and determining, by the at least one device and/or the at least one outside device, whether the contextual data meets a context criterion of a stored contextual data indicative of contextual data of a replaced device;

wherein in accordance with the contextual data meeting the context criterion of the stored contextual data:

receiving, by the replacement device, from one or more of the first device, the at least one device, and the at least one outside device, state data indicative of a known state of the replaced device; and updating the replacement device with the state data.

Item 2. Method of Item 1, wherein a first portion of the state data is received from one device of the cluster of devices or the at least one outside device, and a second portion of the state data is received from another device of the cluster of devices, wherein the one device is different from the another device.

Item 3. Method of any one of the preceding Items, wherein the contextual data comprises one or more of: temperature data, sensor data, light data, vibration data, received signal strength indicator (RSSI) data, location data, connection data, image data, power output data, and radio data.

Item 4. Method of any one of the previous Items, wherein the contextual data comprises a first contextual data indicative of a first environmental context and having a first weight parameter, and a second contextual data indicative of a second environment context and having a second weight parameter.

Item 5. Method of any one of the previous Items, wherein providing the contextual data comprises:

generating, based on the contextual data structure and contextual data, a contextual fingerprint;

wherein the contextual data comprises the contextual fingerprint.

Item 6. Method of Item 5, wherein the method comprises:

obtaining, by the replacement device, updated contextual data;

generating, based on the updated contextual data, an updated contextual fingerprint;

providing the updated contextual fingerprint to the at least one device and/or the at least one outside device; and updating, by the at least one device and/or the at least one outside device, the stored contextual data to the updated contextual fingerprint.

Item 7. Method of Item 6, wherein generating the updated contextual fingerprint comprises generating the updated contextual fingerprint at a time interval.

Item 8. Method of Item 6, wherein generating an updated contextual fingerprint comprises:

determining whether the updated contextual data meets an update criterion of the contextual fingerprint; and in accordance with the updated contextual data meeting the update criterion, providing the updated contextual fingerprint.

Item 9. Method of any one of the previous Items, the method comprising:

determining, by the at least one device and/or the at least one outside device, whether the contextual data meets a stored contextual criterion of a stored contextual data indicative of contextual data of a non-replaced device of the cluster of devices; and in accordance with determining that the contextual data meets the stored contextual criterion, updating the contextual data structure.

Item 10. Method of any one of the preceding Items, wherein the contextual data structure and/or the stored contextual data is stored in a plurality of devices of the cluster of devices and/or the at least one outside device.

Item 11. Method of any one of the previous Items, wherein in accordance with the contextual data meeting the context criterion of the stored contextual data, the method comprises: providing, by the replacement device, an output parameter indicative of the contextual data meeting the context criterion.

Item 12. Method of any one of the previous Items, wherein the at least one device is the first device.

Item 13. Method of any one of Items 1-12, wherein the at least one device is different device in the cluster of devices from the first device.

Item 14. A method of preparing for replacement of a device in a cluster of devices, the method comprising:

obtaining, by a device in a cluster of devices, contextual data indicative of an environment;

generating, by the device, based on the contextual data, a contextual data structure; and providing, by the device, the contextual data and the contextual data structure to another device in the cluster of devices and/or at least one outside device from outside of the cluster of devices.

Item 15. Method of Item 14, wherein providing the contextual data and the contextual data structure comprises providing the contextual data and the contextual data structure to the another device in the cluster of devices.

Item 16. Method of any one of Items 14-15, wherein the contextual data comprises one or more of: temperature data, sensor data, light data, vibration data, received signal strength indicator (RSSI) data, location data, connection data, image data, power output data, and radio data.

Item 17. Method of any one of Items 14-16, wherein the contextual data comprises a first contextual data indicative of a first environmental context and having a first weight parameter, and a second contextual data indicative of a second environment context and having a second weight parameter.

Item 18. Method of any one of Items 14-17, the method comprising providing, by the device, state data indicative of a known state of the device to the another device and/or the at least one outside device.

Item 19. Method of any one of Items 14-18, wherein providing the contextual data comprises:

generating, based on the contextual data structure and contextual data, a contextual fingerprint;

wherein the contextual data comprises the contextual fingerprint.

Item 20. Method of any one of Items 14-19, wherein the contextual data structure and/or the contextual data is provided to a plurality of devices of the cluster of devices and/or the at least one outside device.

Item 21. A replacement device configured to integrate with a cluster of devices, the replacement device comprising:
  memory circuitry;
  interface circuitry; and
  processor circuitry, wherein the processor circuitry is configured to:
    request a contextual data structure from a first device of the cluster of devices and/or at least one outside device from outside of the cluster of devices;
    obtain, based on the received contextual data structure, contextual data indicative of an environmental context of the replacement device;
    provide the contextual data to at least one device of the cluster of devices and/or the at least one outside device;
    receive, from one or more of the first device, the at least one device, and the at least one outside device, state data indicative of a known state of a replaced device; and
    update the replacement device with the state data.

Item 22. Replacement device of Item 21, wherein a first portion of the state data is received from one device of the cluster of devices or the at least one outside device, and a second portion of the state data is received from another device of the cluster of devices, wherein the one device is different from the another device.

Item 23. Replacement device of any one of Items 21-22, wherein the contextual data comprises one or more of: temperature data, sensor data, light data, vibration data, received signal strength indicator (RSSI) data, location data, connection data, image data, power output data, and radio data.

Item 24. Replacement device of any one of Items 21-23, wherein the contextual data comprises a first contextual data indicative of a first environmental context and having a first weight parameter, and a second contextual data indicative of a second environment context and having a second weight parameter.

Item 25. Replacement device of any one of Items 21-24, wherein to provide the contextual data comprises:
  to generate, based on the contextual data structure and contextual data, a contextual fingerprint;
  wherein the contextual data comprises the contextual fingerprint.

Item 26. Replacement device of Item 25, wherein the processor circuitry is configured to:
  obtain updated contextual data;
  generate, based on the updated contextual data, an updated contextual fingerprint;
  provide the updated contextual fingerprint to the at least one device and/or the at least one outside device.

Item 27. Replacement device of Item 26, wherein to generate the updated contextual fingerprint comprises to generate the updated contextual fingerprint at a time interval.

Item 28. Replacement device of Item 26, wherein to generate an updated contextual fingerprint comprises:
  to determine whether the updated contextual data meets an update criterion of the contextual fingerprint; and
  in accordance with the updated contextual data meeting the update criterion, to provide the updated contextual fingerprint.

Item 29. Replacement device of any one of Items 21-28, wherein the at least one device is the first device.

Item 30. Replacement device of any one of Items 21-29, wherein the at least one device is different device in the cluster of devices from the first device.

Item 31. Replacement device of any one of Items 21-30, wherein the replacement device is the same type of device as the replaced device.

Item 32. A system comprising:
  a cluster of devices comprising a first device and at least one device, and/or at least one outside device from outside of the cluster of devices, wherein the cluster of devices and/or the at least one outside device is configured to:
    provide, by the first device and/or the at least one outside device, to a replacement device, a contextual data structure;
    receive, by the at least one device and/or the at least one outside device, from the replacement device, contextual data indicative of an environmental context of the replacement device; and
    determine, by the at least one device and/or the at least one outside device, whether the contextual data meets a context criterion of a stored contextual data indicative of contextual data of a replaced device;
    wherein in accordance with the contextual data meeting the context criterion of the stored contextual data, provide, by one or more of the first device, the at least one device, and/or the at least one outside device, to the replacement device, state data indicative of a known state of the replaced device.

Item 33. System of Item 32, wherein a first portion of the state data is provided from one device of the cluster of devices or the at least one outside device, and a second portion of the state data is provided from another device of the cluster of devices, wherein the one device is different from the another device.

Item 34. System of any one of Items 32-33, wherein the contextual data comprises one or more of: temperature data, sensor data, light data, vibration data, received signal strength indicator (RSSI) data, location data, connection data, image data, power output data, and radio data.

Item 35. System of any one of Items 32-34, wherein the contextual data comprises a first contextual data indicative of a first environmental context and having a first weight parameter, and a second contextual data indicative of a second environment context and having a second weight parameter.

Item 36. System of any one of Items 32-35, wherein the contextual data structure and/or the stored contextual data is stored in a plurality of devices of the cluster of devices and/or the at least one outside device.

Item 37. System of any one of Items 32-36, wherein the system comprises the replacement device.

Item 38. The system of Item 37, wherein the replacement device is configured to update based on the state data.

Item 39. System of Item 38, wherein the replacement device is configured to provide the contextual data to a first device of the cluster of devices and/or the at least one outside device, wherein to provide the contextual data comprises to:
  generate, based on the contextual data structure and contextual data, a contextual fingerprint;
  wherein the contextual data comprises the contextual fingerprint.

Item 40. System of Item 39, wherein:
  the replacement device is configured to:
    obtain updated contextual data;
    generate, based on the updated contextual data, an updated contextual fingerprint;
    provide the updated contextual fingerprint to the at least one device of the cluster of devices and/or the at least one outside device; and
  the at least one device and/or the at least one outside device is configured to update the stored contextual data to the updated contextual fingerprint.
Item 41. System of Item 40, wherein to generate the updated contextual fingerprint comprises to generate the updated contextual fingerprint at a time interval.
Item 42. System of any one of Items 39-41, wherein the at least one device and/or the at least one outside device is configured to:
  determine whether the contextual data meets a stored contextual criterion of a stored contextual data indicative of contextual data of a non-replaced device of the cluster of devices; and
  in accordance with determining that the contextual data meets the stored contextual criterion, update the contextual data structure.
Item 43. System of any one of Items 39-42, wherein in accordance with the contextual data meeting the context criterion of the stored contextual data, the replacement device is configured to:
  provide an output parameter indicative of the contextual data meeting the context criterion.
Item 44. System of any one of Items 32-43, wherein the at least one device is the first device.
Item 45. System of any one of Items 32-43, wherein the at least one device is different device in the cluster of devices from the first device.
Item 46. Method of any one of Items 1-20, wherein the method comprises:
  providing, by the replacement device or the first device, a request parameter indicative of a request to approve the replacement device to a user of the cluster of device; and in accordance with receiving an approval from the user, updating the replacement device with the state data.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that the figures comprise some circuitries or operations which are illustrated with a solid line and some circuitries, components, features, or operations which are illustrated with a dashed line. Circuitries or operations which are comprised in a solid line are circuitries, components, features or operations which are comprised in the broadest example. Circuitries, components, features, or operations which are comprised in a dashed line are examples which may be comprised in, or a part of, or are further circuitries, components, features, or operations which may be taken in addition to circuitries, components, features, or operations of the solid line examples. It should be appreciated that these operations need not be performed in order presented. Furthermore, it should be appreciated that not all of the operations need to be performed. The example operations may be performed in any order and in any combination. It should be appreciated that these operations need not be performed in order presented. Circuitries, components, features, or operations which are comprised in a dashed line may be considered optional.

Other operations that are not described herein can be incorporated in the example operations. For example, one or more additional operations can be performed before, after, simultaneously, or between any of the described operations.

Certain features discussed above as separate implementations can also be implemented in combination as a single implementation. Conversely, features described as a single implementation can also be implemented in multiple implementations separately or in any suitable sub-combination. Moreover, although features may be described above as acting in certain combinations, one or more features from a claimed combination can, in some cases, be excised from the combination, and the combination may be claimed as any sub-combination or variation of any sub-combination It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the examples may be implemented at least in part by means of both hardware and software, and that several "means", "units" or "devices" may be represented by the same item of hardware.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

The various example methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claims, and it will be made obvious to those skilled in the art that various changes and modifications may be made without departing from the scope of the claims. The specification and drawings are, accordingly, to be regarded in an illustrative rather than restrictive sense. The claims are intended to cover all alternatives, modifications, and equivalents.

What is claimed is:

1. A method of integrating a replacement device in a cluster of devices, the method comprising:
    requesting, by the replacement device, a contextual data structure from a first device of the cluster of devices and/or at least one outside device from outside of the cluster of devices, wherein the contextual data structure dictates a format of contextual data that is to be provided by the replacement device;
    receiving, by the replacement device from the first device, the contextual data structure;
    obtaining, by the replacement device, based on the received contextual data structure, contextual data indicative of an environmental context of the replacement device, wherein the contextual data of the replacement device is unique to the cluster of devices such that the contextual data of the replacement device is used to identify the replacement device in the cluster of devices;
    providing, by the replacement device, the contextual data to at least one device of the cluster of devices and/or the at least one outside device; and
    determining, by the at least one device and/or the at least one outside device, whether the contextual data meets a context criterion corresponding to stored contextual data of a replaced device;
    upon determining that the contextual data of the replacement device meets the context criterion of the stored contextual data of the replaced device:
        receiving, by the replacement device, from one or more of the first device, the at least one device, and the at least one outside device, state data indicative of a known state of the replaced device; and
        updating the replacement device with the state data.

2. The method according to claim 1, wherein a first portion of the state data is received from one device of the cluster of devices or the at least one outside device, and a second portion of the state data is received from another device of the cluster of devices, wherein the one device is different from the another device.

3. The method according to claim 1, wherein the contextual data comprises one or more of: temperature data, sensor data, light data, vibration data, received signal strength indicator (RSSI) data, location data, connection data, image data, power output data, and radio data.

4. The method according to claim 1, wherein the contextual data comprises a first contextual data indicative of a first environmental context and having a first weight parameter, and a second contextual data indicative of a second environment context and having a second weight parameter.

5. The method according to claim 1, wherein providing the contextual data comprises:
    generating, based on the contextual data structure and contextual data, a contextual fingerprint;
    wherein the contextual data comprises the contextual fingerprint.

6. The method according to claim 5, wherein the method comprises:
    obtaining, by the replacement device, updated contextual data;
    generating, based on the updated contextual data, an updated contextual fingerprint;
    providing the updated contextual fingerprint to the at least one device and/or the at least one outside device; and
    updating, by the at least one device and/or the at least one outside device, the stored contextual data to the updated contextual fingerprint.

7. The method according to claim 6, wherein generating the updated contextual fingerprint comprises generating the updated contextual fingerprint at a time interval.

8. The method according to claim 6, wherein generating an updated contextual fingerprint comprises:
    determining whether the updated contextual data meets an update criterion of the contextual fingerprint; and
    in accordance with the updated contextual data meeting the update criterion, providing the updated contextual fingerprint.

9. The method according to claim 1, the method comprising:
    determining, by the at least one device and/or the at least one outside device, whether the contextual data meets a stored contextual criterion of a stored contextual data indicative of contextual data of a non-replaced device of the cluster of devices; and
    in accordance with determining that the contextual data meets the stored contextual criterion, updating the contextual data structure.

10. The method according to claim 1, wherein the contextual data structure and/or the stored contextual data is stored in a plurality of devices of the cluster of devices and/or the at least one outside device.

11. The method according to claim 1, wherein in accordance with the contextual data meeting the context criterion of the stored contextual data, the method comprises: providing, by the replacement device, an output parameter indicative of the contextual data meeting the context criterion.

12. The method according to claim 1, wherein the at least one device is the first device.

13. The method according to claim 1, wherein the at least one device is different device in the cluster of devices from the first device.

14. A replacement device configured to integrate with a cluster of devices, the replacement device comprising:
    memory circuitry;
    interface circuitry; and
    processor circuitry, wherein the processor circuitry is configured to:
        request a contextual data structure from a first device of the cluster of devices and/or at least one outside device from outside of the cluster of devices, wherein the contextual data structure dictates a format of contextual data that is to be provided by the replacement device;
        receive, by the replacement device from the first device, the contextual data structure;

obtain, based on the received contextual data structure, contextual data indicative of an environmental context of the replacement device, wherein the contextual data of the replacement device is unique to the cluster of devices such that the contextual data of the replacement device is used to identify the replacement device in the cluster of devices;

provide the contextual data to at least one device of the cluster of devices and/or the at least one outside device;

receive, from one or more of the first device, the at least one device, and the at least one outside device, state data indicative of a known state of a replaced device; and update the replacement device with the state data.

15. The replacement device according to claim 14, wherein a first portion of the state data is received from one device of the cluster of devices or the at least one outside device, and a second portion of the state data is received from another device of the cluster of devices, wherein the one device is different from the another device.

16. The replacement device according to claim 14, wherein the contextual data comprises one or more of: temperature data, sensor data, light data, vibration data, received signal strength indicator (RSSI) data, location data, connection data, image data, power output data, and radio data.

17. The replacement device according to claim 14, wherein the contextual data comprises a first contextual data indicative of a first environmental context and having a first weight parameter, and a second contextual data indicative of a second environment context and having a second weight parameter.

18. The replacement device according to claim 14, wherein to provide the contextual data comprises:

to generate, based on the contextual data structure and contextual data, a contextual fingerprint;

wherein the contextual data comprises the contextual fingerprint.

19. The replacement device according claim 18, wherein the processor circuitry is configured to:

obtain updated contextual data;

generate, based on the updated contextual data, an updated contextual fingerprint;

provide the updated contextual fingerprint to the at least one device and/or the at least one outside device.

20. A system comprising:

a cluster of devices comprising a first device and at least one device, and/or at least one outside device from outside of the cluster of devices, wherein the cluster of devices and/or the at least one outside device is configured to:

provide, by the first device and/or the at least one outside device, to a replacement device, a contextual data structure, wherein the contextual data structure dictates a format of contextual data that is to be provided by the replacement device;

receive, by the at least one device and/or the at least one outside device, from the replacement device, contextual data indicative of an environmental context of the replacement device, wherein the contextual data of the replacement device is unique to the cluster of devices such that the contextual data of the replacement device is used to identify the replacement device in the cluster of devices; and determine, by the at least one device and/or the at least one outside device, whether the contextual data meets a context criterion corresponding to a stored contextual data of a replaced device;

wherein in accordance with upon determining that the contextual replacement device meets the context criterion of the stored contextual data of the replaced device, provide, by one or more of the first device, the at least one device, and the at least one outside device, to the replacement device, state data indicative of a known state of the replaced device.

* * * * *